United States Patent
Zhang et al.

(10) Patent No.: US 10,737,612 B2
(45) Date of Patent: Aug. 11, 2020

(54) WHEEL STRUCTURE WITH CIRCULAR LIGHT EMISSION

(71) Applicant: SHENZHEN CHITADO TECHNOLOGY CO., LTD, Shenzhen, Guangdong (CN)

(72) Inventors: Dianxuan Zhang, Guangdong (CN); Dengjin Zhou, Guangdong (CN); Huihai Zeng, Guangdong (CN); Dengbing Zhou, Guangdong (CN)

(73) Assignee: SHENZHEN CHITADO TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 16/292,229

(22) Filed: Mar. 4, 2019

(65) Prior Publication Data

US 2020/0148100 A1 May 14, 2020

(30) Foreign Application Priority Data

Nov. 14, 2018 (CN) .................... 2018 2 1877875 U

(51) Int. Cl.
*B60Q 1/32* (2006.01)
*F21Y 115/10* (2016.01)

(52) U.S. Cl.
CPC ........... *B60Q 1/326* (2013.01); *F21Y 2115/10* (2016.08)

(58) Field of Classification Search
CPC ......... B60Q 1/326; B60Q 1/0041; F21S 4/28; F21S 43/31; F21S 43/14; G02B 5/08; H05K 1/0274; B62J 6/20; B62J 6/00; F21V 7/05; B60B 2900/571; B60B 2899/572; B60B 7/20; B62K 11/10; B62K 3/002; B62M 7/12; Y10S 362/80; F21Y 115/10
USPC ......................................................... 362/500
See application file for complete search history.

(56) References Cited

U.S. PATENT DOCUMENTS

| | | | | |
|---|---|---|---|---|
| 4,981,329 A | * | 1/1991 | Koch | B60B 7/20 301/37.101 |
| 5,190,354 A | * | 3/1993 | Levy | B60B 7/20 301/37.25 |
| 5,876,108 A | * | 3/1999 | Chien | B60Q 1/326 362/103 |
| 6,241,371 B1 | * | 6/2001 | Dai | A63C 17/223 280/816 |

(Continued)

FOREIGN PATENT DOCUMENTS

GB 2557669 * 6/2018 ............... B60B 7/00

*Primary Examiner* — Isiaka O Akanbi
*Assistant Examiner* — Fatima N Farokhrooz

(57) ABSTRACT

The present disclosure relates to the technical field of wheels. It discloses a wheel structure with circular light emission which includes a fixed shaft, a hub that rotates about the fixed shaft, a light base structure fixedly connected with the fixed shaft, and a light cover protecting the light base structure. The light base structure includes a light strip mounting base and a light strip looped around the light strip mounting base. In this way, the light strip emits light which can create a cool effect when in use. The light base structure is fixedly connected with the fixed shaft so that the light base structure is fixed and damaging of electric wires due to rotation can be prevented. This can improve service life of the product, simplify its structure, lower its production cost, and provide great convenience to the user.

8 Claims, 9 Drawing Sheets

(56) References Cited

U.S. PATENT DOCUMENTS

| | | | | |
|---|---|---|---|---|
| 2003/0169595 A1* | 9/2003 | Lee | ......................... | B60Q 1/326 |
| | | | | 362/500 |
| 2005/0082774 A1* | 4/2005 | Chiu | ................... | A63C 17/223 |
| | | | | 280/11.203 |
| 2005/0099820 A1* | 5/2005 | Cooper | ................. | B60Q 1/326 |
| | | | | 362/500 |
| 2005/0134475 A1* | 6/2005 | Reim | .................... | B60C 13/001 |
| | | | | 340/815.45 |
| 2005/0195612 A1* | 9/2005 | Cho | ........................ | B60Q 1/326 |
| | | | | 362/500 |
| 2007/0137078 A1* | 6/2007 | Sinette | ................... | B60R 13/00 |
| | | | | 40/606.02 |
| 2007/0274085 A1* | 11/2007 | Hampton | ............... | B60Q 1/326 |
| | | | | 362/500 |
| 2008/0101053 A1* | 5/2008 | Hoffman | ............... | G09F 21/045 |
| | | | | 362/35 |
| 2014/0375007 A1* | 12/2014 | Fissell | .................... | F21S 10/02 |
| | | | | 280/87.042 |
| 2015/0138804 A1* | 5/2015 | Salter | ........................ | B60B 7/00 |
| | | | | 362/510 |
| 2019/0193628 A1* | 6/2019 | Chen | ........................ | B62M 7/12 |
| 2019/0376653 A1* | 12/2019 | Dussaume | ................ | F21K 9/65 |

* cited by examiner

WHEEL STRUCTURE WITH CIRCULAR LIGHT EMISSION

CROSS REFERENCE TO RELATED APPLICATIONS

The present application claims the benefit of Chinese Patent Application No. 201821877875.X filed on Nov. 14, 2018, the contents of which are incorporated herein by reference in its entirety.

TECHNICAL FIELD

The present disclosure relates to the technical field of wheels, and in particular to a wheel structure that can emit circular light.

BACKGROUND TECHNOLOGY

With the development of science and technology and the advancement of industrial level, vehicles have gradually become a means of transportation for people. These vehicles provide great convenience for travelling. The types of vehicles are diverse, and may include cars, motorcycles, scooters and balance vehicles.

Wheels are important components of a vehicle. In order to meet the user's aesthetic requirements of the wheels, many manufacturers will install a light-emitting structure on the wheels to create a cool effect when in use.

In the prior art, the light-emitting structure is mostly fixedly connected with the rim. When the rim rotates, the light-emitting structure rotates together with the rim. During rotation of the light-emitting structure, the electric wire can easily be damaged. Furthermore, the light-emitting structure is complicated and its production cost is high.

SUMMARY

An object of the present disclosure is to provide a wheel structure with circular light emission that can solve the problem of damaging of electric wire of the conventional light-emitting wheel structures.

The present disclosure can be achieved by a wheel structure with circular light emission, which may include a fixed shaft; a rim that rotates about the fixed shaft; a light base structure fixedly connected with the fixed shaft; and a light cover covering and protecting the light base structure. The light base structure may include a light strip mounting base and a light strip looped around the light strip mounting base.

Furthermore, the rim may be recessed inwards to form a placement region, the light strip mounting base may be placed in the placement region, and the light strip mounting base may be out of contact with the rim.

Furthermore, the light strip mounting base may be provided with a light strip mounting end face, the light strip mounting base may be provided with an annular groove with openings located on the light strip mounting end face, and the light strip may be embedded in the annular groove.

Furthermore, the annular groove may be provided with an annular sidewall adjacent to a center of the light strip mounting base, and the annular sidewall may be provided with a plurality of sequentially spaced apart accommodating troughs for accommodating light beads on the light strip.

Furthermore, the light strip mounting base may be provided with a light-emerging end face facing away from the light strip mounting end face, the light strip mounting base may be provided with a light-emerging trough with openings located on the light-emerging end face, and a sidewall of the light-emerging trough may be linked up with the accommodating troughs.

Furthermore, a plane mirror may be connected with a lower portion of the sidewall of the light-emerging trough, and a two-way mirror may be connected with an opening region of the light-emerging trough.

Furthermore, an upper portion of the sidewall of the light-emerging trough may be recessed in a direction away from the center of the light strip mounting base to form a slot for placing the two-way mirror, a sidewall of the slot may be provided with a plurality of catching strips for catching an upper end face of the two-way mirror, the catching strips are inclined in a direction from top to bottom towards the center of the light strip mounting base, and the lower portion of the sidewall of the light-emerging trough may be connected to the plane mirror by snap-fitting.

Furthermore, the center of the light strip mounting base may be hollowed and forms a first wire-running through-hole for running of an electric wire, a bottom wall of the light-emerging trough may be formed with a wire placement groove for laying of the wire, and the wire placement groove has a first sidewall and a second sidewall that are disposed opposite to each other, wherein the first sidewall may be provided with a first protruding piece extending towards the second sidewall, a gap formed between the first protruding piece and the second sidewall, and another gap formed between the first protruding piece and a bottom wall of the wire placement groove, wherein the second sidewall may be provided with a second protruding piece extending towards the first sidewall, a gap formed between the second protruding piece and the first sidewall, and another gap formed between the second protruding piece and the bottom wall of the wire placement groove.

Furthermore, the annular sidewall may be provided with a second wire-running through-hole for the wire connecting to the light strip to pass through, and the second wire-running through-hole may be linked up with the light-emerging trough.

Furthermore, the light strip may be an LED light strip.

Compared with the prior art, the present disclosure provides a wheel structure with circular light emission, including a fixed shaft; a rim that rotates about the fixed shaft; a light base structure fixedly connected with the fixed shaft; and a light cover covering and protecting the light base structure. The light base structure includes a light strip mounting base and a light strip looped around the light strip mounting base. The light strip emits light which can create a cool effect when in use. The light base structure can be fixedly connected with the fixed shaft so that the light base structure is fixed and damaging of electric wires due to rotation can be prevented. This can improve service life of the product, simplify its structure, lower its production cost, and provide great convenience to the user.

DETAILED DESCRIPTION OF THE EMBODIMENTS

Figure 1:
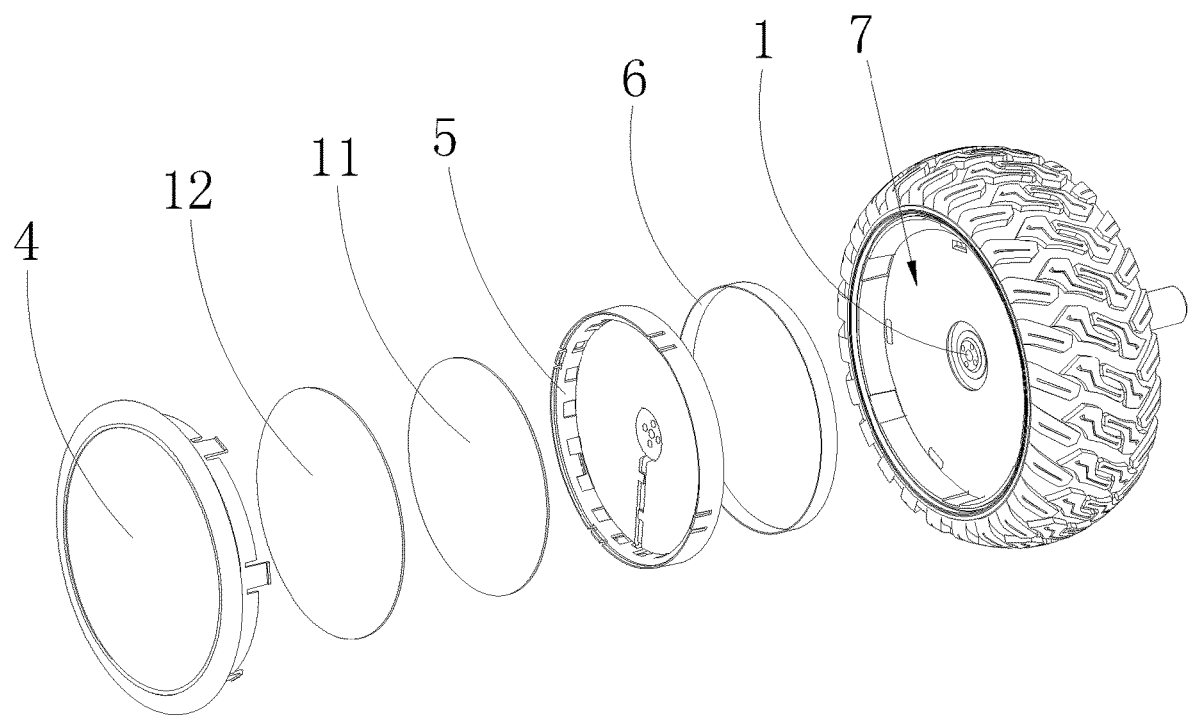
FIG. 1 is an exploded view of a wheel structure with circular light emission according to an embodiment of the present disclosure.

The present disclosure will be further described in detail below with reference to the accompanying drawings and embodiments. It is understood that the specific embodiments described herein are merely illustrative of the disclosure and are not intended to limit the disclosure.

The same or similar reference numerals in the drawings of the present embodiment correspond to the same or similar components. In the description of the present disclosure, it is to be understood that the terms "upper", "lower", "left", "right", etc. indicate the orientation or positional relationship based on the orientation or positional relationship shown in the drawings, and are merely for the convenience of the description of the disclosure and for simplifying the description, rather than indicating or implying that the device or component referred to has a specific orientation. The terms used to describe the positional relationship in the drawings are for illustrative purposes only and are not to be construed as limiting the disclosure. For those skilled in the art, the specific meaning of the above terms may be understood on a case-by-case basis.

The implementation of the present disclosure will be described in detail below with reference to the specific embodiments.

Figure 2:
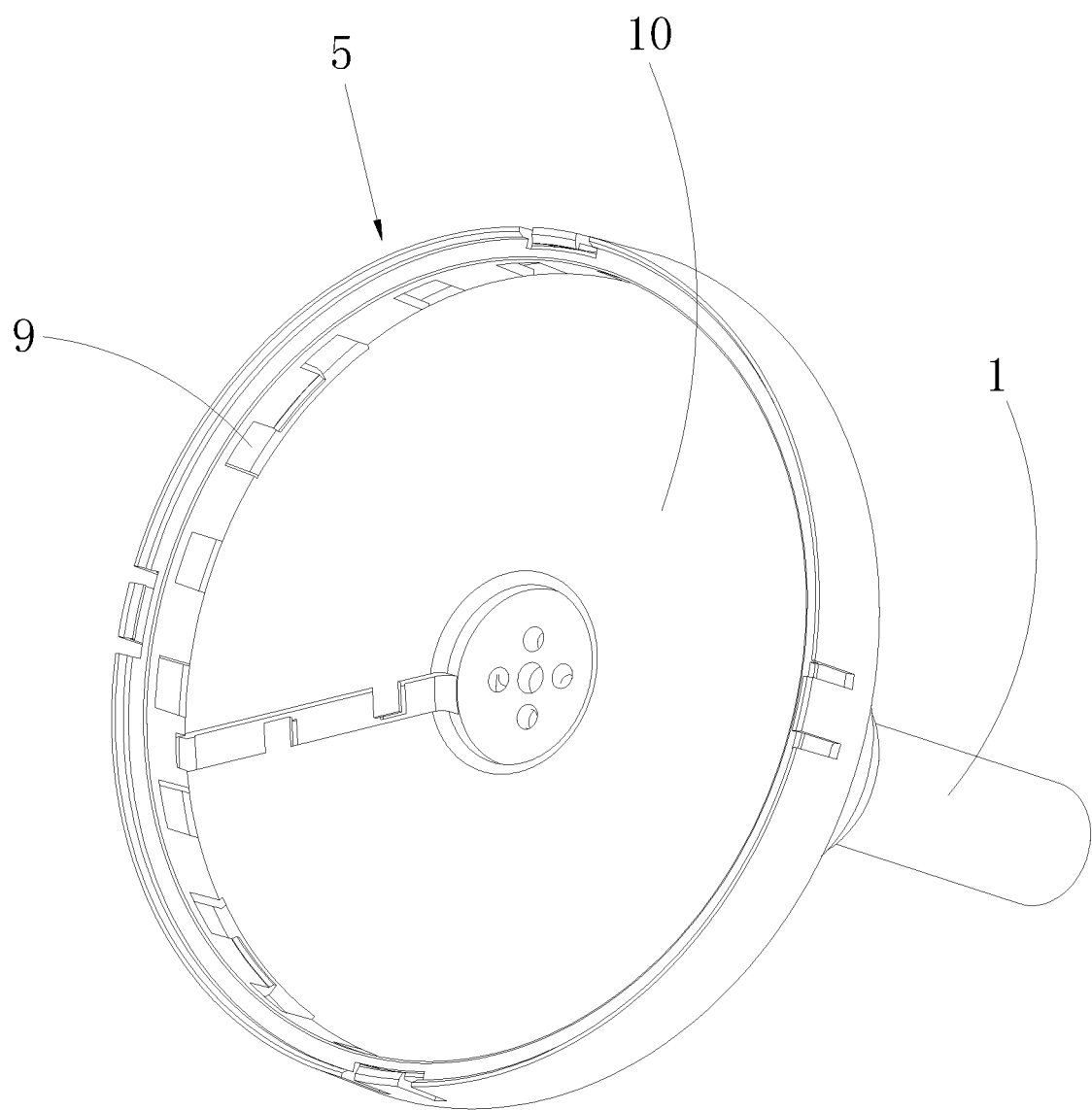
FIG. 2 is a perspective view of a light strip mounting base of the wheel structure with circular light emission according to an embodiment of the present disclosure.
Figure 3:
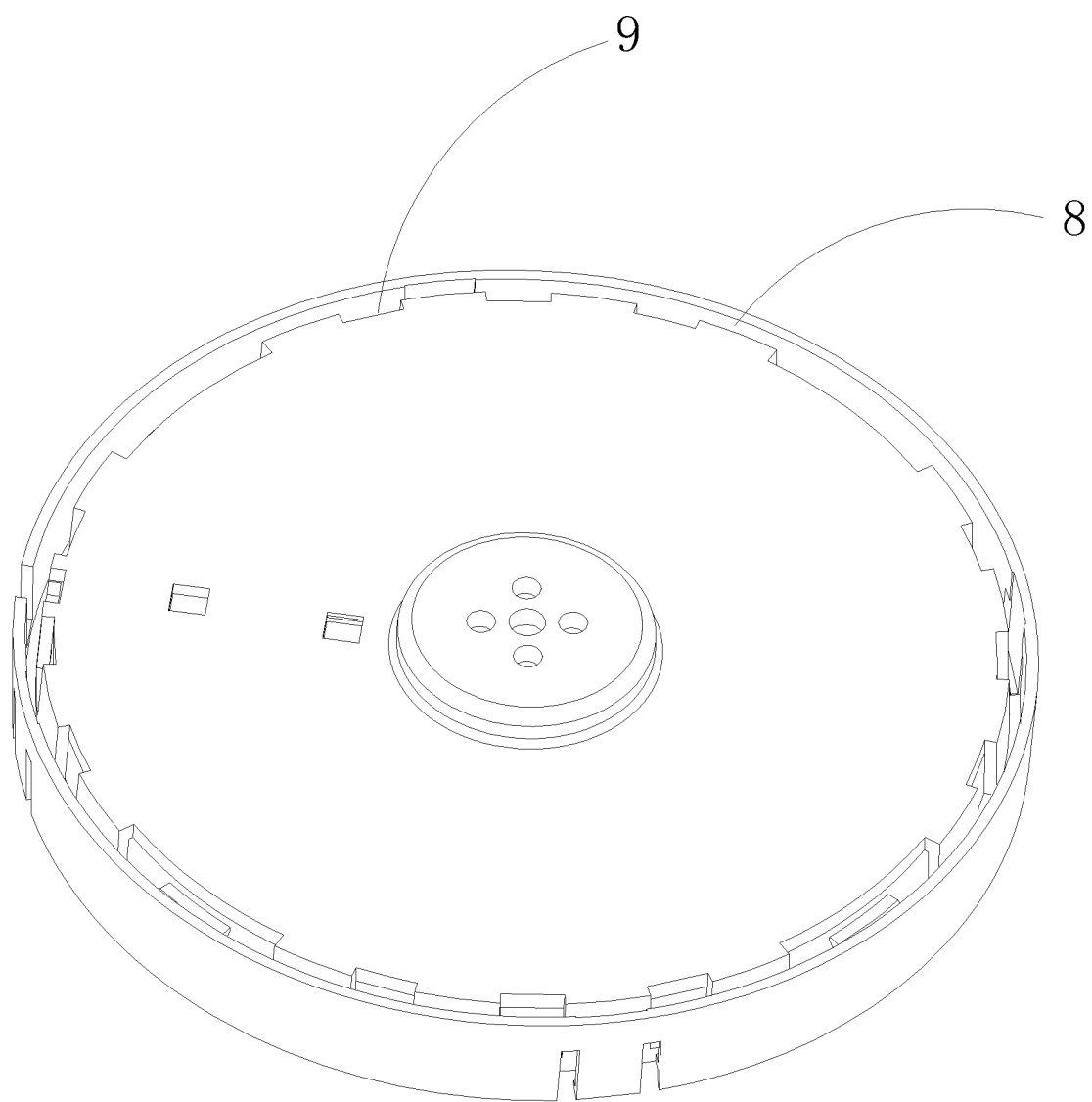
FIG. 3 is a perspective view of a light strip mounting base of the wheel structure with circular light emission according to an embodiment of the present disclosure.
Figure 4:
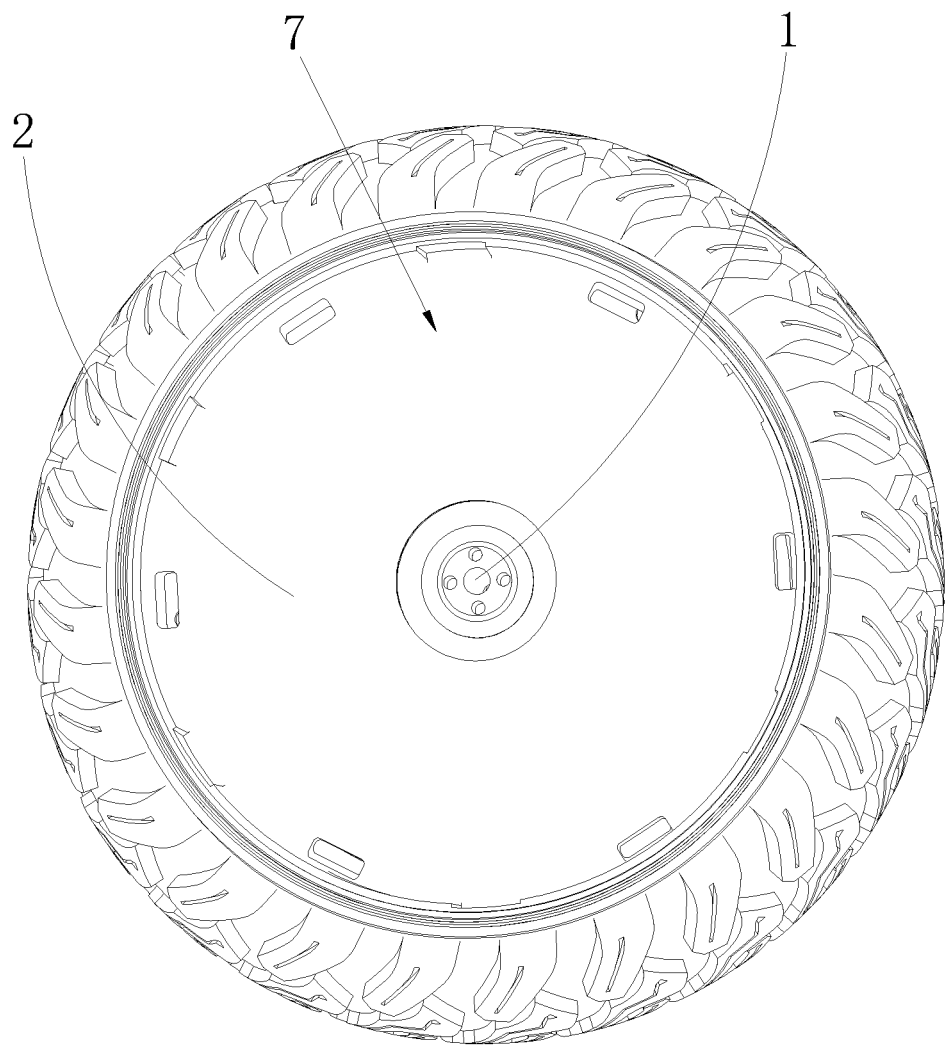
FIG. 4 is a perspective view of a rim of the wheel structure with circular light emission according to an embodiment of the present disclosure.
Figure 5:
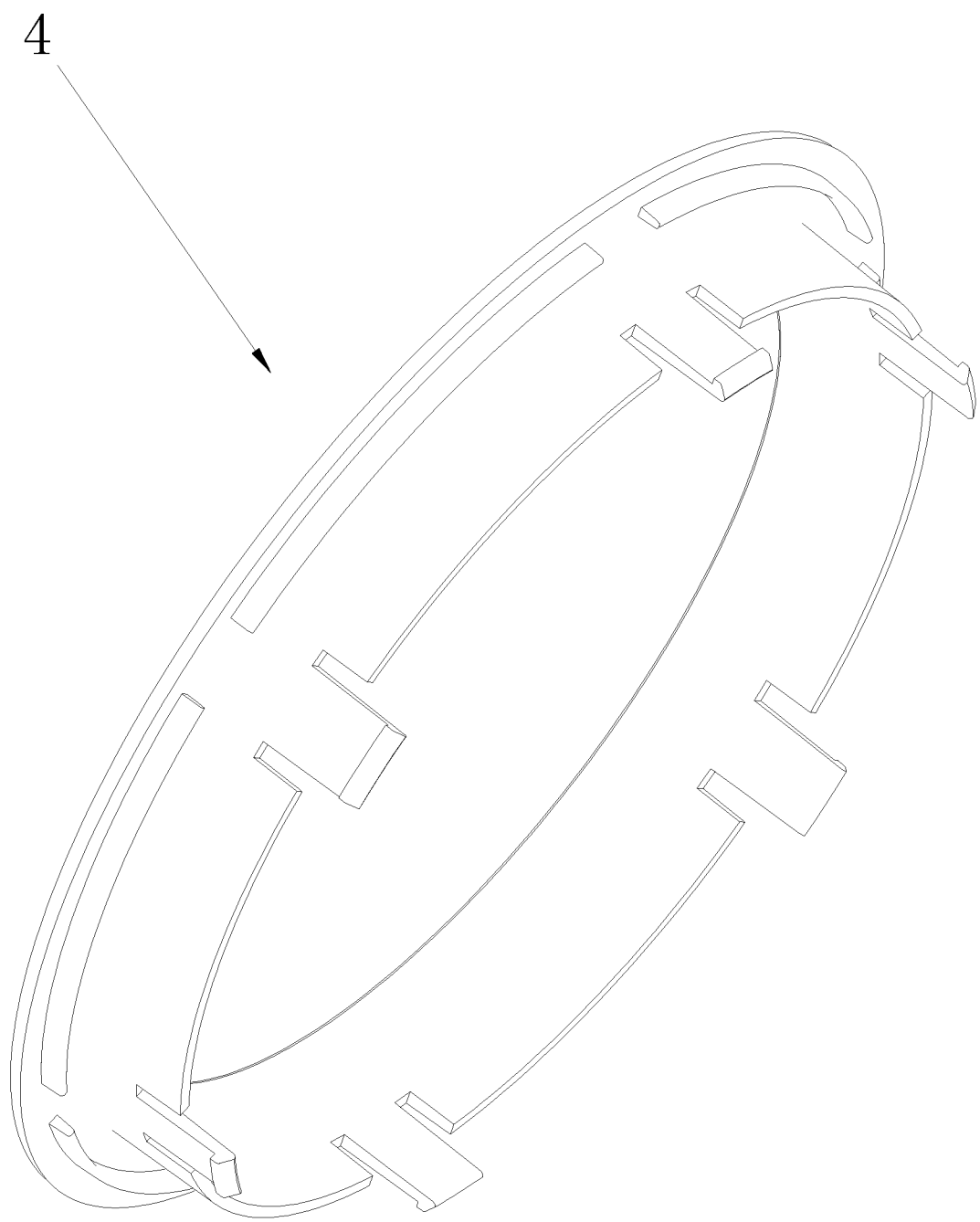
FIG. 5 is a perspective view of a light cover of the wheel structure with circular light emission according to an embodiment of the present disclosure.
Figure 6:
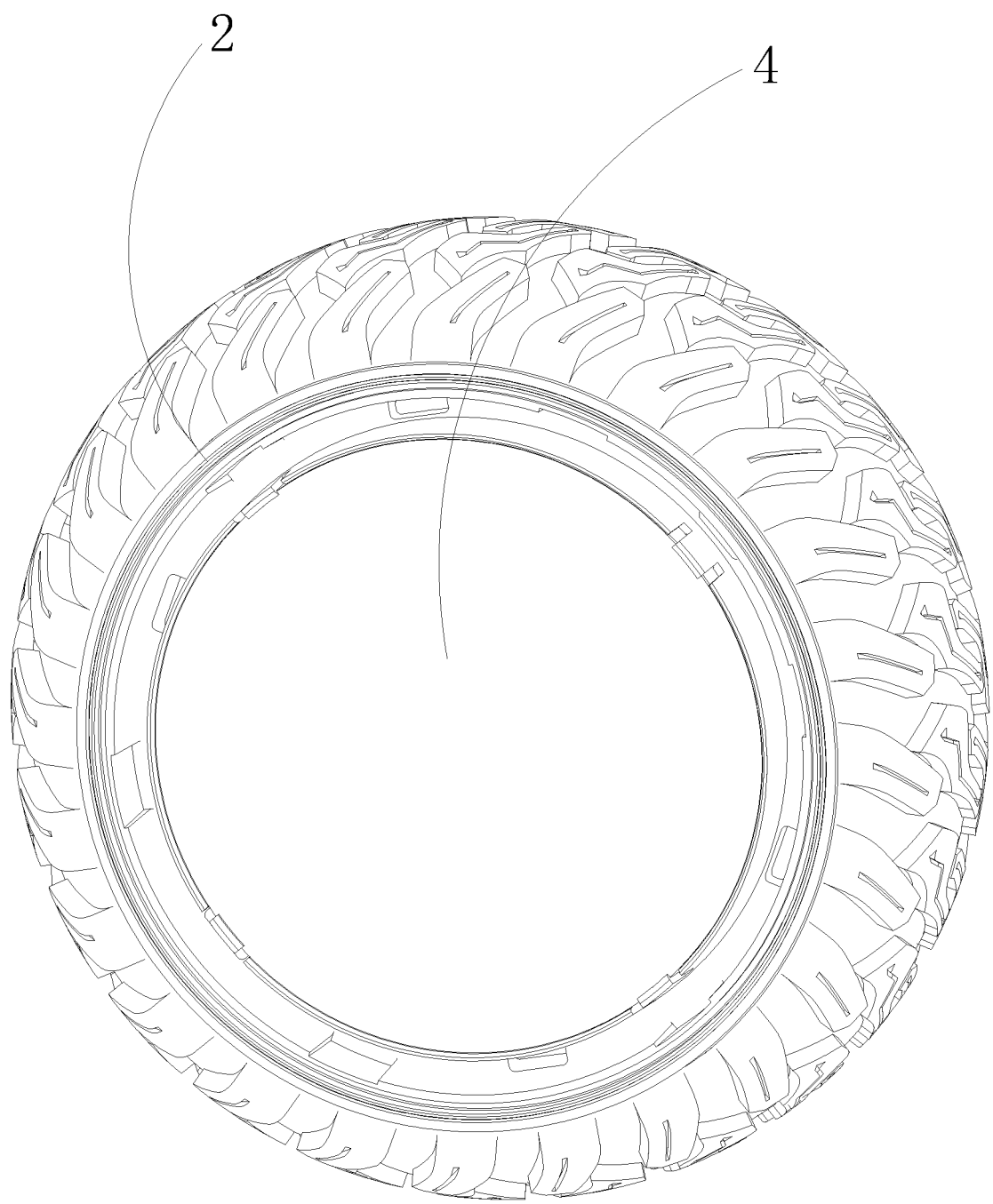
FIG. 6 is a perspective view of the wheel structure with circular light emission according to an embodiment of the present disclosure.
Figure 7:
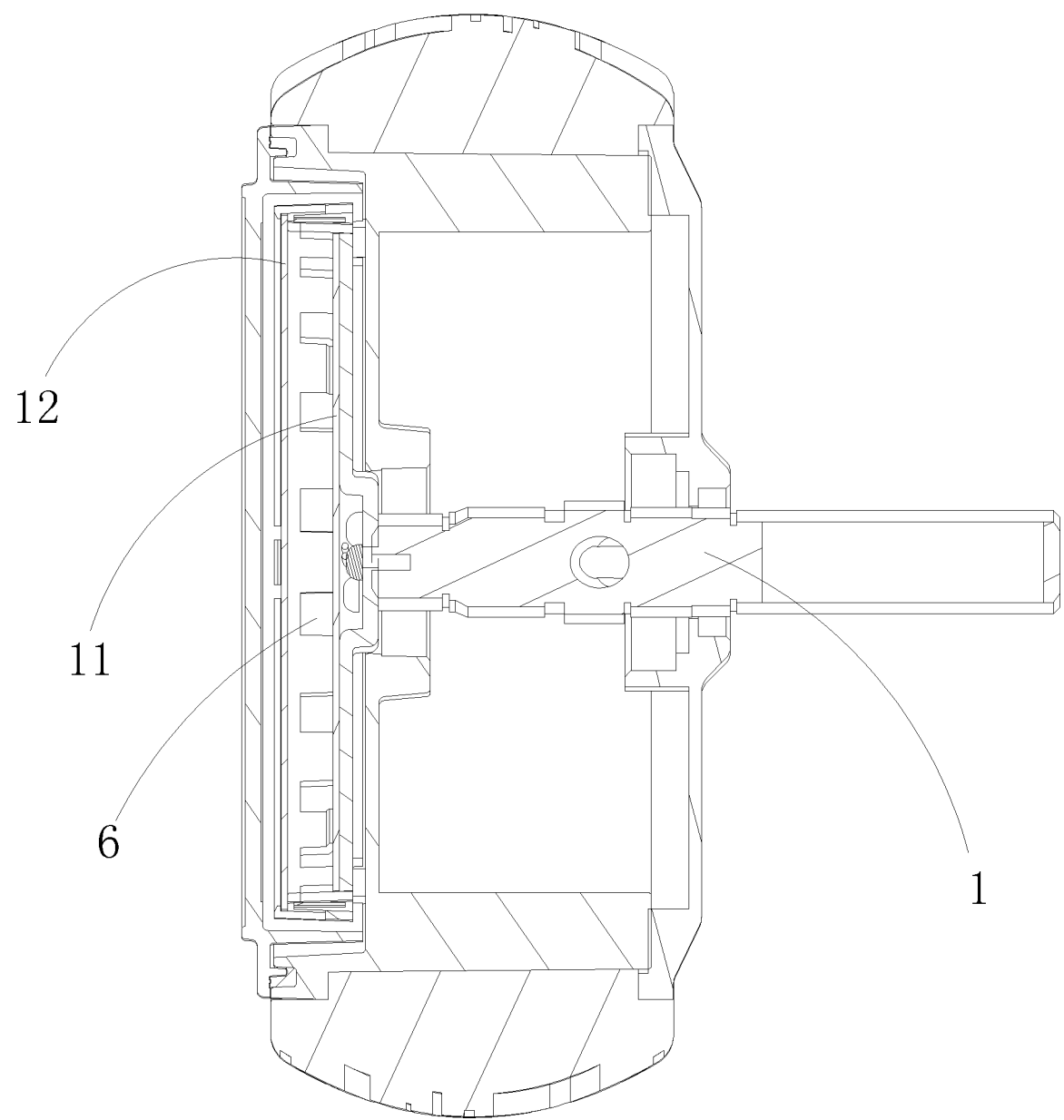
FIG. 7 is a cross sectional view of the wheel structure with circular light emission according to an embodiment of the present disclosure.
Figure 8:
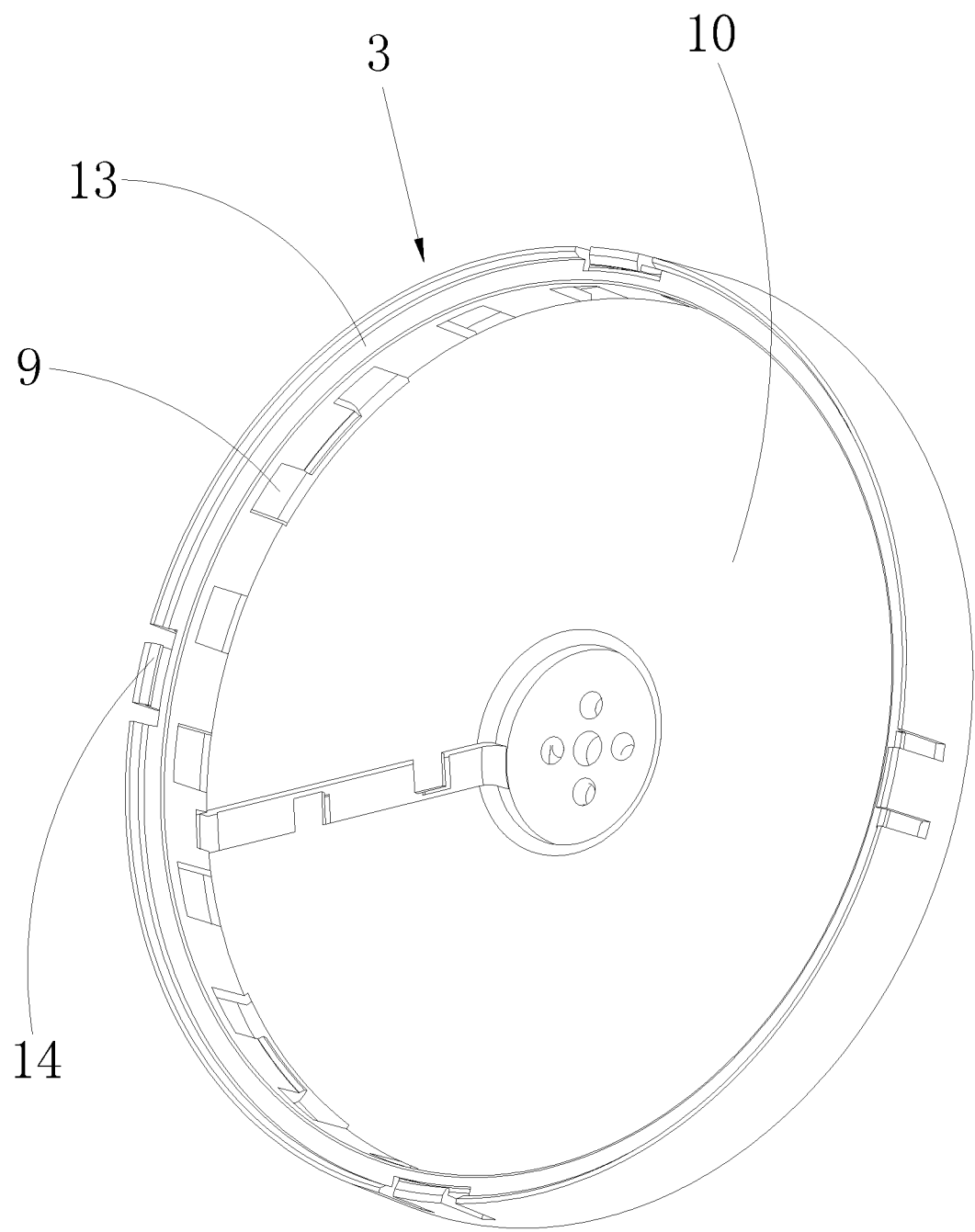
FIG. 8 is a perspective view of the light strip mounting base of the wheel structure with circular light emission according to an embodiment of the present disclosure.
Figure 9:
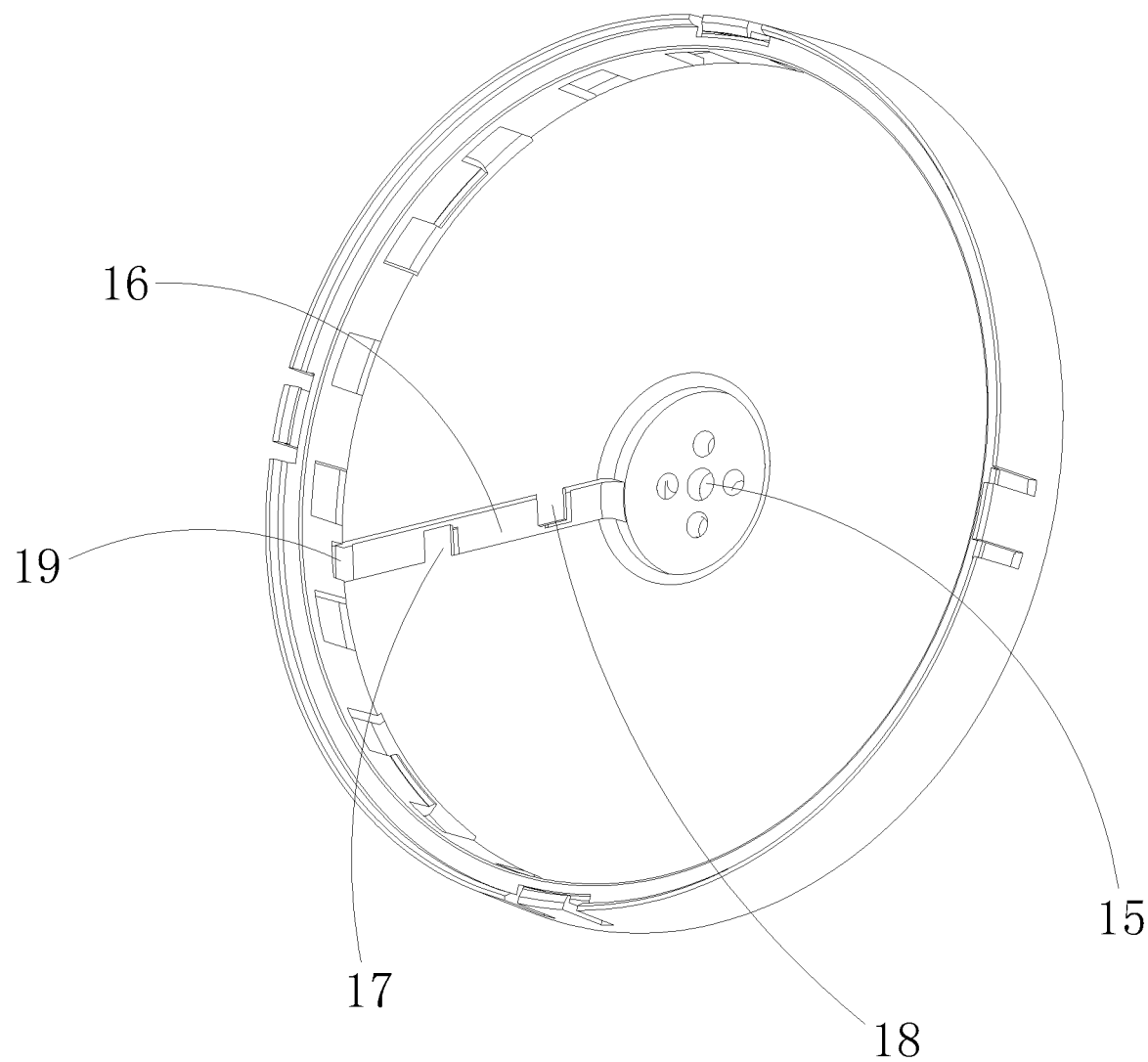
FIG. 9 is a perspective view of the light strip mounting base of the wheel structure with circular light emission according to an embodiment of the present disclosure.

FIGS. 1-9 show the preferred embodiments of the present disclosure.

The wheel structure with circular light emission may include a fixed shaft 1, a rim 2 that rotates about the fixed shaft 1, a light base structure 3 fixedly connected with the fixed shaft 1, and a light cover 4 covering and protecting the light base structure 3. The light base structure 3 may include a light strip mounting base 5 and a light strip 6 looped around the light strip mounting base.

The above wheel structure with circular light emission may be provided through the installation of a fixed shaft 1, a rim 2 that rotates about the fixed shaft 1, a light base structure 3 fixedly connected with the fixed shaft 1, and a light cover 4 covering and protecting the light base structure 3. The light base structure 3 may include a light strip mounting base 5 and a light strip 6 looped around the light strip mounting base. In this way, the light strip 6 emits light which can create a cool effect when in use. The light base structure 3 may be fixedly connected with the fixed shaft 1 so that the light base structure 3 is fixed and damaging of electric wires due to rotation can be prevented. This can improve service life of the product, simplify its structure, lower its production cost, and provide great convenience to the user.

Specifically, the rim 2 may be recessed inwards to form a placement region 7, and the light strip mounting base 5 may be placed in the placement region 7. The light strip mounting base 5 may be out of contact with the rim 2. Since the rim 2 is rotatable and the light strip mounting base 5 is fixed and not moveable, thus in this arrangement, the rotation of the rim 2 would not affect the light strip mounting base 5, and the light strip mounting base 5 would not affect the rotation of the rim 2.

Further, the light strip mounting base 5 may be provided with a light strip mounting end face. The light strip mounting base 5 may be provided with an annular groove 8 with openings located on the light strip mounting end face, and the light strip 6 can be embedded in the annular groove 8. The light strip 6 may be held in the annular groove 8 by adhesive provided at short intervals on the light strip 6. The annular groove 8 can protect the light strip 6. After the light strip 6 is embedded in the annular groove 8, the light strip 6 is not easy to fall apart. The light strip 6 can be easily installed by simply embedding it in the annular groove 8.

Specifically, the annular groove 8 may be provided with an annular sidewall adjacent to a center of the light strip mounting base 5. The annular sidewall may be provided with a plurality of sequentially spaced apart accommodating troughs 9 for accommodating light beads of the light strip 6. The accommodating troughs 9 can serve to accommodate and protect the light beads. Hence, the light beads in the accommodating troughs 9 cannot easily move or fall out.

The light strip mounting base 5 may be provided with a light-emerging end face facing away from the light strip mounting end face. The light strip mounting base 5 may be provided with a light-emerging trough 10 with openings located on the light-emerging end face. A sidewall of the light-emerging trough 10 may be linked up with the accommodating troughs 9. In this way, light emitted from the light beads in the accommodating troughs 9 can be emerged from the light-emerging trough 10.

In the present embodiment, a plane mirror 11 may be connected to a lower portion of a sidewall of the light-emerging trough 10, and a two-way mirror 12 may be connected to an opening region of the light-emerging trough 10. Thus, light emitted from the light beads can be continuously reflected between the plane mirror 11 and the two-way mirror 12, thereby generating a circular light effect.

In the present embodiment, the plane mirror 11 may be connected to the lower portion of the sidewall of the light-emerging trough 10 by snap-fitting connection, and the two-way mirror 12 may also be connected to the opening region of the light-emerging trough 10 by snap-fitting connection. This can facilitate the installation of the plane mirror 11 and the two-way mirror 12. When the plane mirror 11 or the two-way mirror 12 needs to be replaced, it can be replaced easily.

Specifically, an upper portion of the sidewall of the light-emerging trough 10 may be recessed in a direction away from the center of the light strip mounting base 5 to form a slot 13 for placing the two-way mirror 12. The sidewall of the slot 13 may be provided with a plurality of catching strips 14 for catching an upper end face of the two-way mirror 12. The catching strips 14 may be inclined in a direction from top to bottom towards the center of the light strip mounting base 5. The lower portion of the sidewall of the light-emerging trough 10 may be connected to the plane mirror 11 by snap-fitting. The sidewall of the slot 13 may be provided with a plurality of catching strips 14 for catching an upper end face of the two-way mirror to facilitate the installation of the two-way mirror 12. When the two-way mirror 12 needs to be replaced, it can be replaced easily. The catching strips 14 may be inclined in a direction from top to bottom towards the center of the light strip mounting base 5. This can facilitate the insertion of the two-way mirror 12 under the catching strips 14 so that the two-way mirror 12 can be caught by the catching strips 14.

In the present embodiment, the center of the light strip mounting base 5 may be hollowed and forms a first wire-running through-hole 15 for running of an electric wire. A bottom wall of the light-emerging trough 10 may be formed with a wire placement groove 16 for laying of the wire. The wire placement groove 16 may have a first sidewall and a second sidewall that are disposed opposite to each other. The first sidewall may be provided with a first protruding piece 17 extending towards the second sidewall. A gap may be formed between the first protruding piece 17 and the second sidewall, and another gap may be formed between the first protruding piece 17 and a bottom wall of the wire placement groove 16. The second sidewall may be provided with a second protruding piece 18 extending towards the first sidewall. A gap may be formed between the second protruding piece 18 and the first sidewall, and another gap may be formed between the second protruding piece 18 and the bottom wall of the wire placement groove 16.

In this way, the wire connecting to the power source can be led out through the first wire-running through-hole 15 and placed in the wire placement groove 16. When placing the wire in the wire placement groove 16, a section of the wire can be placed in the gap between the first protruding piece 17 and the second sidewall, and another section of the wire can be placed in the gap between the second protruding piece 18 and the first sidewall. Then the section of the wire can be moved into a gap between the first protruding piece 17 and the wire placement groove 16, and the other section of the wire can be moved into a gap between the second protruding piece 18 and the wire placement groove 16. Hence, the wire can be stored in the wire placement groove 16. The wire cannot be easily moved to other positions, and cannot be easily damaged. As a result, it prolongs the service life of the wire, and it is simple and convenient to install the wire.

Furthermore, the annular sidewall can be provided with a second wire-running through-hole 19 for the wire connecting to the light strip to pass through. The second wire-running through-hole 19 can be linked up with the light-emerging trough 10.

Thus, the wire connecting to the power source can be led through the first wire-running through-hole 15, placed in the wire placement groove 16, passed through the second wire-running through-hole 19, and then electrically connected to the light strip 6, thereby realizing the supply of power to the light strip 6. The installation of the wire is simple, and the wire is not easy to be moved and displaced.

The light base structure 3 can be fixedly connected to the fixed shaft 1 by bolts. However, it is not limited to this kind of connection.

Specifically, the light strip mounting base 5 and the light cover 4 may be connected by a snap-fitting structure. This can facilitate the mounting and dismounting of the light cover 4.

In the present embodiment, the light strip 6 can be an LED light strip 6. LED light source has good applicability and high stability. It is energy saving and environment protecting, and has a long service life.

The above are only some preferred embodiments of the present disclosure, and are not intended to be a limitation of the present disclosure. Any modification, equivalent substitution and improvement made within the spirit and principle of the present disclosure should fall within the scope of protection defined by the appending claims.

What is claimed is:

1. A wheel structure with circular light emission, comprising a fixed shaft; a rim that rotates about the fixed shaft; a light base structure fixedly connected to the fixed shaft; and a light cover covering and protecting the light base structure, wherein the light base structure comprises a light strip mounting base and a light strip looped around the light strip mounting base;

wherein the rim is recessed inwards to form a placement region, the light strip mounting base is placed in the placement region;

wherein the light strip mounting base is provided with a light strip mounting end face and an annular groove with openings located on the light strip mounting end face, and wherein the light strip is embedded in the annular groove;

wherein the annular groove is provided with an annular sidewall adjacent to a center of the light strip mounting base, and the annular sidewall is provided with a plurality of sequentially spaced apart accommodating troughs for accommodating light beads of the light strip;

wherein the light strip mounting base is provided with a light-emerging end face facing away from the light strip mounting end face and a light-emerging trough with openings located on the light-emerging end face, and wherein a sidewall of the light-emerging trough is linked up with the accommodating troughs;

wherein the center of the light strip mounting base is hollowed and forms a first wire-running through-hole for running of an electric wire, a bottom wall of the light-emerging trough is formed with a wire placement groove for laying of the electric wire, and the wire placement groove has a first sidewall and a second sidewall that are disposed opposite to each other wherein the first sidewall is provided with a first protruding piece extending towards the second sidewall, with a first gap formed between the first protruding piece and the second sidewall and a second gap formed between the first protruding piece and a bottom wall of the wire placement groove, and wherein the second sidewall is provided with a second protruding piece extending towards the first sidewall, with a third gap formed between the second protruding piece and the first sidewall and a fourth gap formed between the second protruding piece and the bottom wall of the wire placement groove.

2. The wheel structure with circular light emission according to claim 1, wherein a plane mirror is connected to a lower portion of the sidewall of the light-emerging trough, and a two-way mirror is connected to an opening region of the light-emerging trough.

3. The wheel structure with circular light emission according to claim 1, wherein the annular sidewall is provided with a second wire-running through-hole for the electric wire connecting with the light strip to pass through, and the second wire-running through-hole is linked up with the light-emerging trough.

4. The wheel structure with circular light emission according to claim 1, wherein the light strip is an LED light strip.

5. The wheel structure with circular light emission according to claim 2, wherein an upper portion of the sidewall of the light-emerging trough is recessed in a direction away from the center of the light strip mounting base to form a slot for placing the two-way mirror, a sidewall of the slot is provided with a plurality of catching strips for catching an upper end face of the two-way mirror, the catching strips are inclined in a direction from top to bottom towards the center of the light strip mounting base, and the lower portion of the sidewall of the light-emerging trough is connected with the plane mirror by snap-fitting.

6. The wheel structure with circular light emission according to claim 2, wherein the light strip is an LED light strip.

7. The wheel structure with circular light emission according to claim 5, wherein the light strip is an LED light strip.

8. The wheel structure with circular light emission according to claim 3, wherein the light strip is an LED light strip.

\* \* \* \* \*